United States Patent [19]
Bhakuni et al.

[11] 3,821,017
[45] June 28, 1974

[54] PROCESS FOR TREATING TIRE CORD FABRIC AND IMPROVED RUBBER STRUCTURES THEREFROM

[75] Inventors: Roop S. Bhakuni, Copley; John G. Morgan, Akron, both of Ohio

[73] Assignee: The Goodyear Tire & Rubber Company, Akron, Ohio

[22] Filed: June 23, 1972

[21] Appl. No.: 265,875

[52] U.S. Cl............ 117/76 T, 117/80, 117/161 KP, 117/161 P, 156/110 A, 156/315, 156/331, 156/335
[51] Int. Cl............................................ B32b 25/02
[58] Field of Search ....... 156/331, 315, 110 A, 335; 117/76 T, 80, 161 KP, 161 P

[56] References Cited
UNITED STATES PATENTS

| | | | |
|---|---|---|---|
| 2,990,313 | 6/1961 | Knowles et al. | 156/110 A |
| 3,060,078 | 10/1962 | Atwell | 156/110 A |
| 3,240,649 | 3/1966 | Atwell | 156/315 |
| 3,240,650 | 3/1966 | Atwell | 156/315 |
| 3,240,659 | 3/1966 | Atwell | 156/110 A X |
| 3,268,467 | 8/1966 | Rye et al. | 156/335 X |
| 3,661,623 | 5/1972 | Bhakuni et al. | 156/110 A X |
| 3,707,178 | 12/1972 | Miller et al. | 156/331 |

*Primary Examiner*—Ralph Husack
*Attorney, Agent, or Firm*—F. W. Brunner; C. R. Schupbach; V. G. Parker

[57] ABSTRACT

The bonding of tire cord fabric to rubber is improved by treating the surface of the fabric with a solvent solution of a polyisocyanate containing a polycarbodiimide.

10 Claims, No Drawings

PROCESS FOR TREATING TIRE CORD FABRIC AND IMPROVED RUBBER STRUCTURES THEREFROM

This invention relates to an improved process for treating tire cord fabric useful in the reinforcement of rubber and to improved rubber structure such as a pneumatic tire made with the fabric treated in accordance with the process of this invention.

It is known to improve the bond between the fabric and the rubber by treating the fabric with an isocyanate from a solvent solution as shown in U.S. Pat. No. 3,240,650. An economical process requires recycling of the solvent. Unfortunately the recycled solvent extracts finish oils and low molecular weight fractions as well as moisture from the fabric being treated. The accumulation of moisture and finish oils in the recycled solvent is undesirable resulting in precipitates commonly referred to in the trade as dirt. When sufficient dirt accumulates in the dip tank containing the solvent and the isocyanate, the fabric being treated in the tank is undesirably affected showing up in a rubber structure such as a pneumatic tire in loss of resistance to fatigue and peel strength.

It has been discovered that these problems can be overcome by treating the tire cord fabric in a solvent solution of an isocyanate containing an effective amount of a polycarbodiimide.

The term "polycarbodiimide" (PCD) is meant to include compounds having two nitrogen atoms connected to a carbon atom by double bonds and more specifically, to compounds having the following general formula

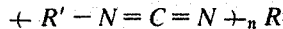

wherein $R$ and $R'$ are radicals independently selected from the group consisting of aryl, alkyl, aralkyl or alkoxy radicals and wherein $n$ is less than 10 and preferably between 2 and 4. The polycarbodiimides are generally substances of a highly viscous to solid nature, and depending on their molecular weight, they are substances which are more or less sparingly soluble or insoluble in organic solvents. Any suitable polycarbodiimide may be used such as those obtained in accordance with U.S. Pat. No. 2,941,966 which describes a process of preparing polycarbodiimides using polyisocyanates in the presence of catalytic quantities of phospholines and their oxides and sulfides. The polycarbodiimides especially useful in the present invention may be shown by the following general formula

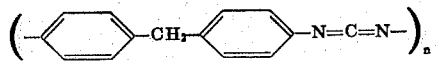

wherein $n$ is less than 10 and preferably between about 4 and 2.

The amount of polycarbodiimide may range from about 5 percent to about 50 percent of the amount of polyisocyanate present in the solvent dip or from about 0.01 part to about 1.0 part and preferably from about 0.02 to about 0.4 part per 100 parts of solvent.

The following isocyanates may be used in the first treatment of the tire cord fabric when dissolved in a suitable inert solvent for the isocyanate.

Polymethylene polyphenylisocyanate (PAPI)
Triphenyl methane-triisocyanate (TMTI)
2,4-Tolylene-diisocyanate (2,4-TDI)
2,6-Tolylene-diisocyanate (2,6-TDI)
Bitolylene diisocyanate (TODI)
Dianisidine diisocyanate (DADI)
Hexamethylene diisocyanate (HDI)
m-Phenylene diisocyanate (PDI)
1-Alkyl-benzene-2,4-diisocyanate (AB-2,4-DI)
1-Alkyl-benzene-2,5-diisocyanate (AB-2,5-DI)
2,6-Dialkyl-benzene-1,4-diisocyanate (DBDI)
1-Chlorobenzene-2,4-diisocyanate (CDI)
Dicyclohexylmethane-diisocyanate (CXDI)
3,3-Dimethoxy diphenyl methane-4,4'-diisocyanate (DDMDI)
1-Nitrobenzene-2,4-diisocyanate (NDI)
1-Alkoxy-benzene-2,4-diisocyanate (ABDI)
1-Alkylbenzene-2,6-diisocyanate (ADI)
m-Xylylene-diisocyanate (XDI)
1,3-Dimethyl-4,6-bis($\beta$-isocyanatoethyl)-benzene-diisocyanate (DBIBDI)
Hexahydrobenzidine-4,4'-diisocyanate (HBDI)
Ethylene-diisocyanate (EDI)
Propylene-1,3-diisocyanate (PDI)
Cyclohexylene-1,2-diisocyanate (CDI)
3,3'-Dichloro-4,4'-biphenylene diisocyanate (DBDI)

2,3-Dimethyl-tetramethylene diisocyanate (DTDI)
p,p'-Diphenylene diisocyanate (DPDI)
2-Chlorotrimethylene diisocyanate (CTDI)
Butane-1,2,2-triisocyanate (BTI)
Trimethylene diisocyanate (TMDI)
Tetramethylene diisocyanate (TDI)
Propylene-1,2-diisocyanate (PDI)
Butylene-1,2-diisocyanate (BDI)
Ethylidene diisocyanate (EDI)
Metaphenylene diisocyanate (MPDI)
Diphenylmethane 4,4'-diisocyanate (DP-4,4-DI)
Diphenyl 4,4'-diisocyanate (DPDI)
1,5-Diisocyanate naphthalene (1,5-DIN)
2,4-Diisocyanate chlorbenzene (2,4-DICB)
4,4',4''-Triisocyanate triphenyl methane (4,4',4''-TITM)
Polymethylene diisocyanate (PMDI)

The amount of polyisocyanate may range from 0.1 to about 2 parts and preferably from about 0.2 to about 0.5 part per 100 parts of solvent.

Suitable inert solvents for the isocyanates are (1) chlorinated hydrocarbons including methylene chloride, trichlorethylene, dichlorethane, trichlorethane, (2) esters including methyl acetate, ethyl acetate, (3) ketones including acetone and methyl ethyl ketone, and (4) aromatic solvents including benzene and toluene. These solvents are removed from the cord by heating the cord at about the boiling point of the solvent and usually between about 150° F. to about 350° F.

This invention is described by example as follows where all parts are by weight.

EXAMPLE 1

A reinforcing element comprising a polyester cord 1,300/3,8/8 is treated by passing the cord through a composition comprising a solvent (1,1,1-trichlorethane) solution of a polycarbodiimide having an $n$ value of 4 in the general formula

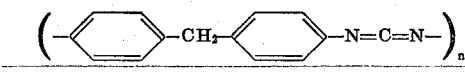

and polymethylene polyphenylisocyanate (PAPI) for the formula

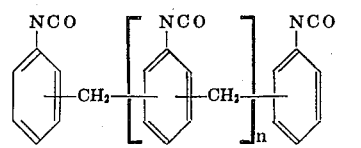

where $n$ has an average value of 1.2 and a Brookfield viscosity of 1,500 cps measured at 25° C. using a No. 3 spindle revolving at 250 rpm. The amounts of polyisocyanate and polycarbodiimide deposited on the cord is shown in Table I. The polyisocyanate treated cord is then dried to remove the solvent from the cord and the dried cord is then treated with an R/F/L/BNCO adhesive prepared as shown below by passing the cord through the adhesive at such a rate as to deposit on the surface of the cord between about 3 percent to about 10 percent adhesive solids and preferably 4 percent as was deposited in the experiments listed in Table I. This may be achieved by passing the cord through the adhesive composition at the rate of between about 20 yards to about 30 yards per minute and then drying the adhesive on the cord at a temperature of about 425° F. for about 2½ minutes. The treated cord is then imbedded in a rubber stock compounded as follows.

Rubber Stock

| | Ingredients | Parts by Weight Amount Used | May be Used |
|---|---|---|---|
| 1. | Natural Rubber | 70 | 0–100 |
| 2. | OE/SBR 1778 (styrene/butadiene-1,3 23.5/76.5 copolymer) (plus 37½ parts oil per 100 SBR | 27.5 | 100.0 |
| 3. | Cis 1,4-polybutadiene | 10 | 0–50 |
| 4. | Carbon Black (Reinforcing agent) | 40 | 25–100 |
| 5. | Zinc Oxide (Activator of cure) | 4 | 2–10 |
| 6. | Stearic Acid (Activator of cure) | 2 | 1.5–3.0 |
| 7. | Primary Accelerator (2,2'-dithio-bisbenzothiazole) | 1.25 | .5–3.0 |
| 8. | Pine Oil (Softener) | 10 | 2–50 |
| 9. | Secondary Accelerator (Tetramethylthiuram disulfide) | .10 | .05–1.0 |
| 10. | Antioxidant | .60 | .1–4 |
| 11. | Sulfur (Vulcanizing agent) | 2.5 | 1.0–5.0 |

In compounding the rubber stock in accordance with the formulation set forth above, a masterbatch of ingredients 1 and 2 are made with the carbon black and mixed on a mill to a temperature of about 110° C. and may be mixed at a temperature as high as 140° C. The resulting carbon black masterbatch is then cooled and the remaining compounds are mixed into the batch in the order indicated above to a temperature of about 70° C. and may be mixed at a temperature as high as 100° C.

The treated cord is then imbedded in this rubber and cured for 11 minutes at 310° F. at 50 psi. The cord peel force and fatigue are expressed on a rating of 100 for the control in which no polycarbodiimide is used in the first dip.

A heat durability (fatigue) test is made by forming a tube of rubber reinforced with the cord first treated with a polyisocyanate, then with the R/F/L/BNCO adhesive and then tested in accordance with the "Mallory" tube fatigue test described in ASTM D–88-5–59T, Section 42, and also as described in U.S. Pat. No. 2,412,524. Table I shows how the conditions of cord treatment affect peel adhesion and fatigue. In each instant the same amount of second dip is applied to the cord, i.e., 4 parts per 100 parts of cord. Amounts between 5 and 25 parts may be used.

In the second dip containing a blocked isocyanate (BNCO) any of the polyisocyanates above listed may be blocked with an R/F resin in the following manner: 110 parts of resorcinol, 25 parts by volume of formalin (37 percent formaldehyde in methanol and water), and 20 parts by volume of water is reacted together in a reaction vessel equipped with both heating and cooling coils, a reflux condenser and a suitable agitator. The mixture is heated to a reflux temperature (100° C.) and allowed to remain at this temperature for 15 minutes, after which an additional 30 parts by volume of formalin was added to the reaction mixture over a period of 10 minutes. After being refluxed for an additional 30 minutes, the resin formed in the reaction vessel was allowed to cool to room temperature. A thick, syrupy resin (for convenience referred to as Resin A) containing 60 percent solids, a viscosity of 750 cps. and a pH of 7 was obtained.

Twenty parts of the Resin A described above is reacted with 6 parts of polymethylene polyphenylisocyanate for 48 hours at 72° F. At the end of this time, the resulting reaction mixture is treated with 0.1 part of sodium hydroxide and 100 parts of water. The resulting neutralized resin-blocked polyisocyanate may be used as such or may be allowed to age for 8 hours before being used, (and for convenience to be referred to as resin BNCO).

The R/F/L/BNCO adhesive used as a second cord treatment is prepared as follows: a 20 percent solids dispersion of an adhesive conventionally known as R/F/L is made in accordance with the following formula.

R/F/L Adhesive

| Ingredients | Parts |
|---|---|
| Resorcinol | 98 |
| Formaldehyde (37%) | 53 |
| Terpolymer rubber latex of styrene/butadiene-1,3/vinylpyridine 15/70/15 (41%) | 1152 |
| Water | 543 |

This R/F/L adhesive is prepared by adding 98 parts of the resorcinol to 196 parts of water, followed by the addition of 53 parts of formaldehyde. The resulting mixture is aged for 1 hour and then 1,152 parts of terpolymer rubber latex is added. The resulting mixture is aged for a period of 72 hours. After aging, the balance of the water is added. To 65 parts of this R/F/L composition is added 35 parts of the resin blocked isocyanate BNCO described above and allowed to age at 72° F. for 4 hours. This is the adhesive used for the second treatment of the tire cord.

The following table sets forth experiments all of which were run in accordance with the procedure set forth in Example 1.

Table I

Effect of First Dip Reaction Products On Cord Properties

|  | (1) 1st Dip (Control) | (2) 1st Dip (Filtered) | (3) 1st Dip (Control) + PCD | (4) 1st Dip Pick Up | | (5) 2nd Dip Pick Up R/F/L/BNCO |
|---|---|---|---|---|---|---|
|  |  |  |  | PCD | PAPI |  |
| Peel Force | 100 | 106 | 104 | .02 | .4 | 4. |
| Fatigue | 100 | 150 | 140 | .02 | .4 | 4. |

From the data shown in Table I, it is observed that the presence of the polycarbodiimide (PCD) is essential in order to produce the effect obtained on the tire cord fabric in regard to peel force and fatigue. The 1st dip control (1) contained 0.4 part of PAPI but no polycarbodiimide and was aged for 20 hours. This same 1st dip control was filtered and an improvement in peel force and fatigue was observed at (2). The requirement to mechanically filter the recycled solvent is an expensive operation and the present invention produced a similar effect but without the added operation of filtration as shown at (3) where 0.02 part of PCD was added to the 1st dip control. All cords treated as shown at (1), (2) and (3) also were treated with a second dip of R/F/L/BNCO, dried and then imbedded in rubber stock and tested to obtain the peel force and fatigue data shown in Table I.

The effect of the amount of polycarbodiimide added to the polyisocyanate solvent first dip is shown in Table II.

Table II

Effect of Polycarbodiimide on the Fatigue Durability of Dipped Polyester Cord

| Polycarbodiimide | PAPI | Peel Force Rating | Fatigue Rating |
|---|---|---|---|
| 0. (Control) | .4 | 100 | 100 |
| .02 | .4 | 88 | 218 |
| .04 | .4 | 83 | 217 |
| .06 | .4 | 80 | 177 |
| .08 | .4 | 86 | 162 |
| .20 | .4 | 93 | 188 |
| .40 | .4 | 92 | 170 |

The conditions set forth in Table I at (3) are repeated here but the amount of the polycarbodiimide used is varied as shown. All parts are by weight per 100 parts of solvent.

The combination of the first and second cord treatments of this invention may be applied to any tire cord tending to take up moisture and includes those cords made of such material as regenerated cellulose also known as rayon, linear polyamides also known as nylon 6, nylon 66, and aromatic nylons such as p-aminobenzoic acid polymer (p-abap) as described in French Pat. No. 1,526,745, linear polyesters such as polyethylene terephthalate also known as Dacron and Vycron, linear polyaminotriazoles, glass fibers, linear polycarbonates, linear polyethers and polyurethanes, and linear polyolefins. Especially improved adhesion and resistance to fatigue is found when bonding the polyesters and the polyamides to rubber. The tire cord treated by the process of this invention is made in a conventional manner using, for example, polyethylene terephthalate filaments as a yarn having a total denier of approximately 7,800 drawn 6 to 1 to about 1,300 denier which yarn is plied 8 turns per inch, 3 plies of which are twisted 8 turns per inch in reverse direction to form a cord referred to as 1,300/3,8/8.

The treatment of polyester fiber by the method of this invention is especially effective in the construction of a conventional tubeless pneumatic tire comprising an open-bellied, hollow annular body terminating in spaced apart bead portions as described in U.S. Pat. No. 2,987,094. The tire is made with plies of polyester cord bonded to rubber with the polyisocyanate pretreatment followed by treatment with the R/F/L/BNCO adhesive as described above as a second dip, dried on the cord at about 425° F. for about 2½ minutes.

While certain representative embodiments and details have been shown for the purpose of illustrating the invention, it will be apparent to those skilled in this art that various changes and modifications may be made therein without departing from the spirit or scope of the invention.

What is claimed is:

1. A process for the treatment of a tire cord fabric which comprises passing the fabric through at least one solvent solution of an organic polyisocyanate containing from about 0.01 part to about 1.0 part by weight of polycarbodiimide per 100 parts by weight of solvent.

2. A process wherein the fabric treated as in claim 1 is treated with a second dip containing rubber latex, a resinous phenol/aldehyde reaction product and an organic polyisocyanate/water soluble thermoplastic resin addition product, the resin in the addition product being the product of the reaction of an aldehyde with a phenol.

3. The process of claim 1 wherein the solvent is an aliphatic chlorinated hydrocarbon selected from the group consisting of trichloroethylene, dichloroethane, and trichloroethane.

4. The process of claim 1 where the polycarbodiimide is present in an amount from about 0.02 to about 0.4 part per 100 parts of solvent.

5. The process of claim 4 where the polyisocyanate is present in an amount from about 0.1 to about 2 parts per 100 parts of solvent.

6. The process of claim 1 wherein the polyisocyanate is polymethylene polyphenylisocyanate.

7. The process of claim 1 wherein the polycarbodiimide has an *n* value of less than 10 in the general formula

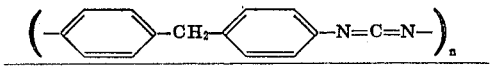

8. The process of claim 1 wherein the solvent is 1,1,1-trichlorethane.

9. The article resulting from the process of claim 1.

10. A heat stable structure comprising rubber reinforced with the article of claim 9.

* * * * *